United States Patent Office 3,835,091
Patented Sept. 10, 1974

3,835,091
FLAME RESISTANT REINFORCED POLYOLEFIN
MIXTURE
Gunther Roos, Kelkheim, Taunus, Robert Kaussen, Kriftel, and Ulrich van Spankeren, Hofheim, Taunus, Germany, assignors to Farbwerke Hoechst Aktiengesellschaft vormals Meister Lucius & Bruning, Frankfurt am Main, Germany
No Drawing. Filed Mar. 1, 1973, Ser. No. 336,903
Claims priority, application Germany, Mar. 7, 1972,
P 22 10 914.4
Int. Cl. C08f 45/04, 45/58
U.S. Cl. 260—42.45                    4 Claims

ABSTRACT OF THE DISCLOSURE

Flame resistant, reinforced polyolefin mixtures containing, in addition to polyolefin, talcum, antimony trioxide and tetrabromophthalic anhydride or an addition product of 3 moles of hexachloro-cyclopentadiene per mole of tris-acryloyl-perhydrotriazine.

---

The present invention relates to flame resistant reinforced polyolefin mixtures.

It is known to increase the mechanical resistance values, for example, hardness and rigidity, of polyolefin by homogeneous incorporation of mineral fillers, for example, asbestos, talcum or glass fibers. It is also known that the flammability of easily combustible thermoplastics may be reduced by adding inorganic and/or organic flame retarding agents, for example, red phosphorus, antimony trioxide, organic chlorine or bromine compounds, or organic or inorganic phosphates. However, the addition rate of these flame retarding agents must often be in a range which adversely affects the technological and processing properties of the thermoplastics.

It has now been found that, by adding simultaneously talcum, antimony trioxide and an organic halogen compound to polyolefins, mixtures can be obtained which are not only mechanically consolidated and flameproof, but in which, because of a synergistic decrease of flammability, the amount of antimony trioxide and organic halogen compound can be substantially reduced, so that there are considerably less disadvantageous effects of these substances.

Subject of the present invention are therefore flame resistant reinforced mixtures of polyolefins composed of relative to the total mixture, (a) from 50 to 86 weight percent of polyolefins,
(b) from 5 to 40 weight percent of talcum,
(c) from 5 to 25, preferably from 8 to 15 weight percent or organic halogen containing flame retarding agents, and
(d) from 4 to 10 weight percent of antimony trioxide.

Suitable polyolefins for the mixtures of the invention are high pressure and low pressure polyethylene, polypropylene and copolymers of ethylene and up to 15 mole percent of the higher homologues thereof, above all propylene or butene-1, or copolymers of propylene and up to 15 mole percent of the higher homologues thereof or of ethylene. Also mixtures of these polymers with themselves may be used. Polypropylene is the most preferred substance to be employed.

Suitable organic, halogen containing flame retarding agents are above all the chlorine and bromine compounds known for this application. Preferred substances are tetrabromophthalic anhydride or an addition product of 3 moles of hexachloro-cyclopentadiene per 1 mole of tris-acryloyl-perhydro-triazine.

The shaped articles manufactured from the mixtures of the invention are distinguished by a high degree of rigidity and hardness, and by being inflammable with great difficulty only, although the amount of organic and inorganic flame retarding agent is considerably decreased. Thus, products are obtained which very satisfactorily meet the requirements for example of automotive industry and electrical engineering.

The mixtures of the invention are prepared according to known mixing processes, for example by mixing the single components in high-speed mixers. The powder mixture may be directly processed in injection molding machines having shearing screws, or before the final shaping, homogenized and granulated by means of an extruder.

In order to improve the resistance against aging and heat during the processing, there are added to the mixtures preferably usual polyolefin stabilizer systems, and, optionally, also hydrochloric acid acceptors, such as they are known for stabilizing polyvinyl chloride. Phenolic antioxidants together with organic sulfides and organic tin compounds have proved to give excellent results.

The following example illustrates the excellent flame retarding activity of the combination of talcum and usual flame retarding agents according to this invention. As the comparison of the following examples with and without talcum shows, the amount of organic and inorganic flame retarding agent necessary for pure polypropylene can be decreased to 50 to 40 weight percent of the amounts otherwise necessary.

EXAMPLE

A polypropylene having a melting index $i_5$ (230° C.) of 10 g./10 min., stabilized with 0.1 weight percent of bis-(3,3-bis-(4-hydroxy-3-tert.-butylphenyl)-butanic acid)-glycol ester, 0.5 weight percent of di-octadecyl-disulfide, 0.4 weight percent of dibutyl-tin-carboxylate and 0.4 weight percent of calcium stearate, was mixed with the additives indicated in the Table in a high-speed mixer. The single samples were granulated in an extruder at temperatures of from 180 to 220° C., and dried. Subsequently, the test articles necessary were injection molded under the usual processing conditions.

The Table shows the results obtained with the mixtures of the invention and corresponding comparative samples. These results prove that the amount of organic and inorganic flame retarding agents can be substantially reduced when talcum is added.

TABLE

| Percent | | | | | Extinguishing time in sec. at 1,100° C.[1] | Small burner test surface inflammation, 1-4 mm. | Acc. to VDE 0730 angle inflammation, 2 mm. |
|---|---|---|---|---|---|---|---|
| Polypropylene | Talcum | Tetrabromophthalic anhydride | Add. product of hexachloro-cyclopentadiene on trisacryloyl-perhydrotriazine | Sb$_2$O$_3$ | | | |
| [2]100 | | | | | 80 | − | − |
| [2]65 | | | 20 | 15 | 2.5 | + | + |
| 50 | 25 | | 15 | 10 | 2.0 | + | + |
| 52 | 30 | | 10 | 8 | 1.9 | + | + |
| 58 | 30 | | 8 | 4 | 2.2 | + | + |
| [2]70 | 30 | | | | 70 | − | − |
| [2]75 | | 15 | | 10 | 2.3 | + | + |
| 52 | 30 | 10 | | 8 | 2.0 | + | + |
| 56 | 30 | 8 | | 6 | 2.0 | + | + |
| 52 | 38 | 6 | | 4 | 4.6 | + | + |

[1] Acc. to Schramm Zebrowski (slit rod test) average of 5 tests each.
[2] Comparative tests.

What is claimed is:
1. Flame resistant, reinforced polyolefin mixture composed of, relative to the total mixture,
 (a) from 50 to 86 weight percent of at least one polyolefin,
 (b) from 5 to 40 weight percent of talcum,
 (c) from 5 to 25 weight percent of organic, halogen containing flame retarding agent selected from the group comprising tetrabromophthalic anhydride and an addition product comprising 3 moles of hexachloro-cyclopentadiene per mole of tris-acryloylperhydrotriazine, and
 (d) from 4 to 10 weight percent of antimony trioxide.
2. Flame resistant, reinforced mixture as defined in claim 1, in which the polyolefin is polypropylene.
3. Flame resistant, reinforced mixture as defined in claim 1, in which the organic, halogen containing flame retarding agent comprises 8 to 15 weight percent of an addition product of 3 moles of hexachloro-cyclopentadiene per mole of tris-acryloylperhydrotriazine.
4. Flame resistant, reinforced mixture as defined in claim 1, in which the organic, halogen containing flame retarding agent comprises 8 to 15 weight percent of tetrabromophthalic anhydride.

References Cited
UNITED STATES PATENTS

| | | |
|---|---|---|
| 3,720,643 | 3/1973 | Abu-Isa et al. _____ 260—41.5 A |
| 3,470,177 | 9/1969 | Zimmermann _____ 260—45.8 NT |
| 3,576,784 | 4/1971 | Gloor _____ 260—45.8 NT |
| 3,738,958 | 6/1973 | Paul _____ 260—45.8 A |
| 3,354,191 | 11/1967 | Stivers _____ 260—45.85 T |
| 3,730,940 | 5/1973 | Versnel _____ 260—41 A |

ALLAN LIEBERMAN, Primary Examiner
J. H. DERRINGTON, Assistant Examiner

U.S. Cl. X.R.
260—42.46, 45.7 R, 45.8 NT